No. 874,437. PATENTED DEC. 24, 1907.
L. E. PUCKETT.
KETTLE COVER.
APPLICATION FILED AUG. 7, 1907.
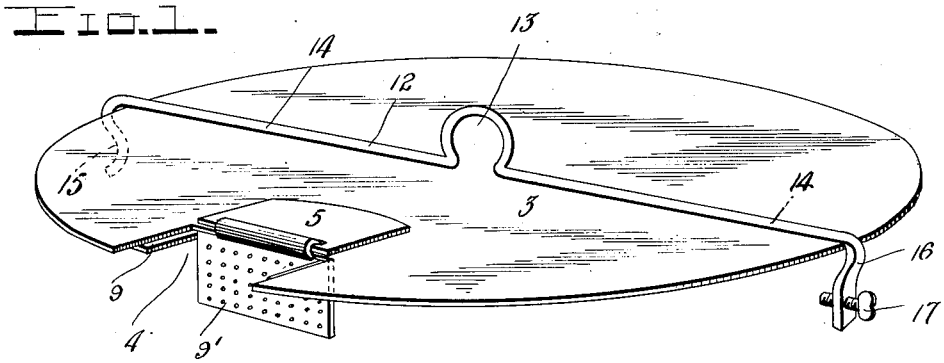
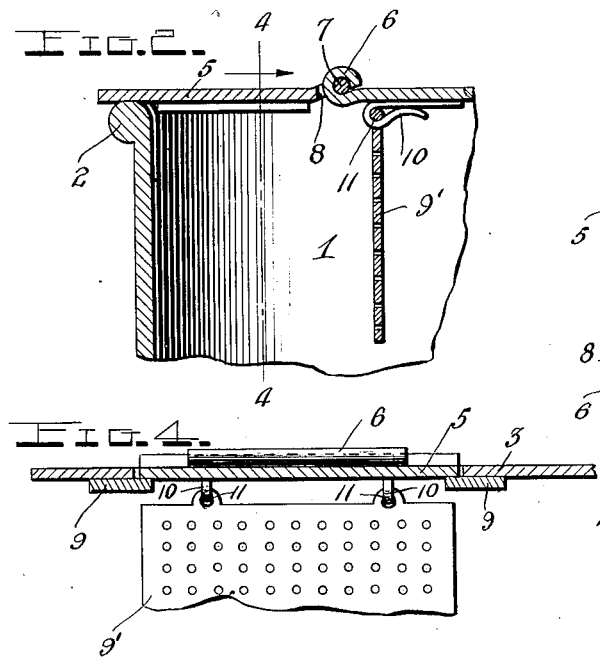
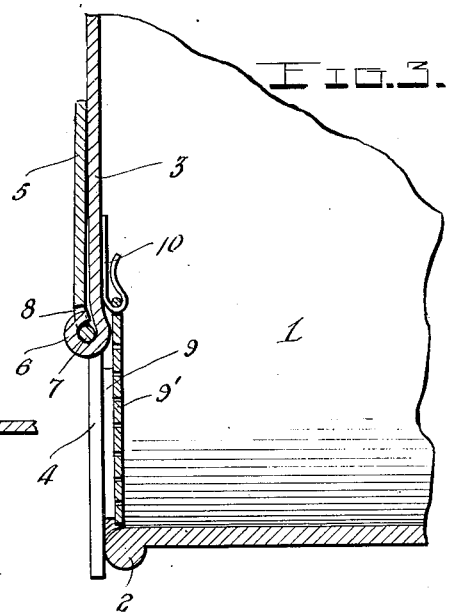
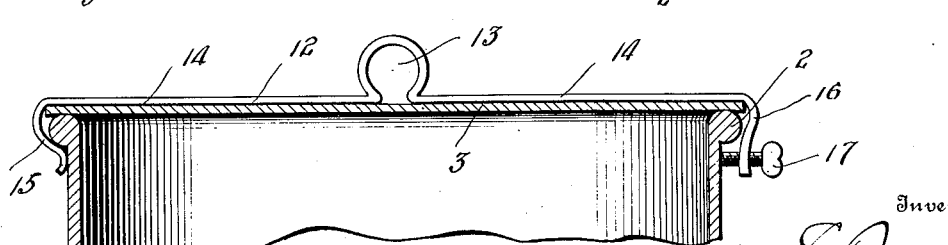
Witnesses
Chas. Griesbauer.
D. L. Nash.
Inventor
Louisa E. Puckett
By Watson E. Coleman, Attorney

UNITED STATES PATENT OFFICE.

LOUISA E. PUCKETT, OF VERMILION, SOUTH DAKOTA.

KETTLE-COVER.

No. 874,437.  Specification of Letters Patent.  Patented Dec. 24, 1907.

Application filed August 7, 1907. Serial No. 387,519.

*To all whom it may concern:*

Be it known that I, LOUISA E. PUCKETT, a citizen of the United States, residing at Vermilion, in the county of Clay and State of South Dakota, have invented certain new and useful Improvements in Kettle-Covers, of which the following is a specification, reference being had to the accompanying drawings.

My invention relates to improvements in covers for kettles, pots and the like and it consists in the novel construction and the combination and arrangement of parts hereinafter described and claimed.

The object of the invention is to provide a cover of this character by means of which vegetables or other food in the pot or kettle may be drained without danger of scalding or burning the fingers.

A further object of the invention is to provide a cover of this character with improved means for securing it upon the pot or kettle.

The above and other objects are attained in the preferred embodiment of the invention illustrated in the accompanying drawings, in which:

Figure 1 is a perspective view of my improved kettle cover; Fig. 2 is a transverse sectional view through a portion of the cover and a kettle or pot; Fig. 3 is a similar view showing the kettle tilted; Fig. 4 is a detail section taken on the plane indicated by the line 4—4 in Fig. 2, and Fig. 5 is a detail section showing the manner in which the cover is secured upon the pot or kettle.

In the drawings 1 denotes the upper portion of a pot, kettle or the like of any description having a bead or shoulder 2 surrounding its upper edge, and 3 denotes a cover or lid of slightly greater diameter than the pot and having at a suitable point in its edge an opening 4. The latter is preferably of rectangular shape and of such size as to prevent potatoes and other large vegetables from passing therethrough when the pot is tilted to drain water or other liquid from them, as presently explained. This drain opening 4 is adapted to be closed by a swinging cover 5 so as to prevent escape of heat and steam while the contents of the pot are being cooked. The cover 5 is hingedly connected to the inner edge of the recess 4 by forming upon the latter a tongue 6 which is bent around a pintle 7 formed upon the cover 5 by providing a slot 8 in it adjacent to its edge. When the cover 5 is closed its ends are adapted to rest upon shoulders 9 formed by strips suitably secured upon the under face of the cover 3, as more clearly shown in Fig. 4.

In order to permit small vegetables such as peas, and beans to be drained, I preferably provide a removable or detachable strainer 9' in the form of a plate having fine perforations. The strainer plate 9' is pivotally hung from the under side of the cover 3 so as to swing downwardly over the opening 4 when the pot or kettle is tilted. This connection is also such as to enable the strainer plate to be detached or removed from the cover 3 when desired, and as shown it consists of two spring hooks 10 secured upon the under side of said cover and adapted to be engaged by eyes 11 upon the strainer plate 9'. It will be understood that this strainer 9' may be formed of woven wire, fabric or other foraminous material.

In order to secure the cover or lid 3 upon the pot or kettle I preferably provide a transversely extending rod 12 bent at its center to form a finger loop or eye 13 and having its oppositely extending straight portions 14 soldered or otherwise secured upon the outer face of said cover. One end of the rod 12 is bent downwardly and inwardly to form a resilient engaging hook or jaw 15 to engage the bead 2 upon the pot, and its other end 16 is bent downwardly and formed with a threaded aperture to receive a clamping screw 17. The inner end of the latter is adapted to impinge against the outer surface of the pot and upon its outer end is a suitable finger piece.

From the foregoing it will be seen that my improved cover is of simple and comparatively inexpensive construction and that it is exceedingly convenient in use upon pots or kettles in which vegetables or other foods are cooked. When the closure 5 for the opening 4 is closed there will be no loss of steam and when it is desired to drain the liquid from the vegetables within the pot it is only necessary to swing the cover 5 inwardly and to tilt the kettle, as shown in Fig. 3. When large vegetables such as potatoes are being boiled the strainer 9' is unnecessary, but when smaller vegetables such as peas, or when jelly is being made, the strainer 9' is applied to the spring hooks 10 so that when the kettle is tilted it will swing down and cover the opening 4.

Having thus described my invention what I claim is:

1. A cover of the character described having in its edge an opening, a closure for the same, spring hooks upon the under side of the cover adjacent to said opening, and a strainer having eyes detachably engaged with said spring hooks, said strainer being adapted to swing over said opening, substantially as described.

2. A cover of the character described having in its edge an opening, the latter having at its ends shoulders and at its inner edge an integral tongue bent to form a pivot loop or eye, a closure for said opening in the form of a plate having a straight inner edge and a longitudinal slot adjacent to said edge to provide a pintle, the latter being arranged in the loop or eye formed by said tongue to hingedly secure said closure upon the upper or outer face of the cover and permit it to swing down and engage said shoulders to close the opening in the cover, spring hooks upon the under side of the cover adjacent to said opening and a strainer having eyes detachably engaged with said hooks, said strainer being adapted to swing over said opening, substantially as described.

In testimony whereof I hereunto affix my signature in the presence of two witnesses.

LOUISA E. PUCKETT.

Witnesses:
A. B. GEPPERT,
C. J. PUCKETT.